Nov. 18, 1969
E. F. MEYER ET AL
3,478,575
LIQUID DILATOMETER
Filed Sept. 1, 1967
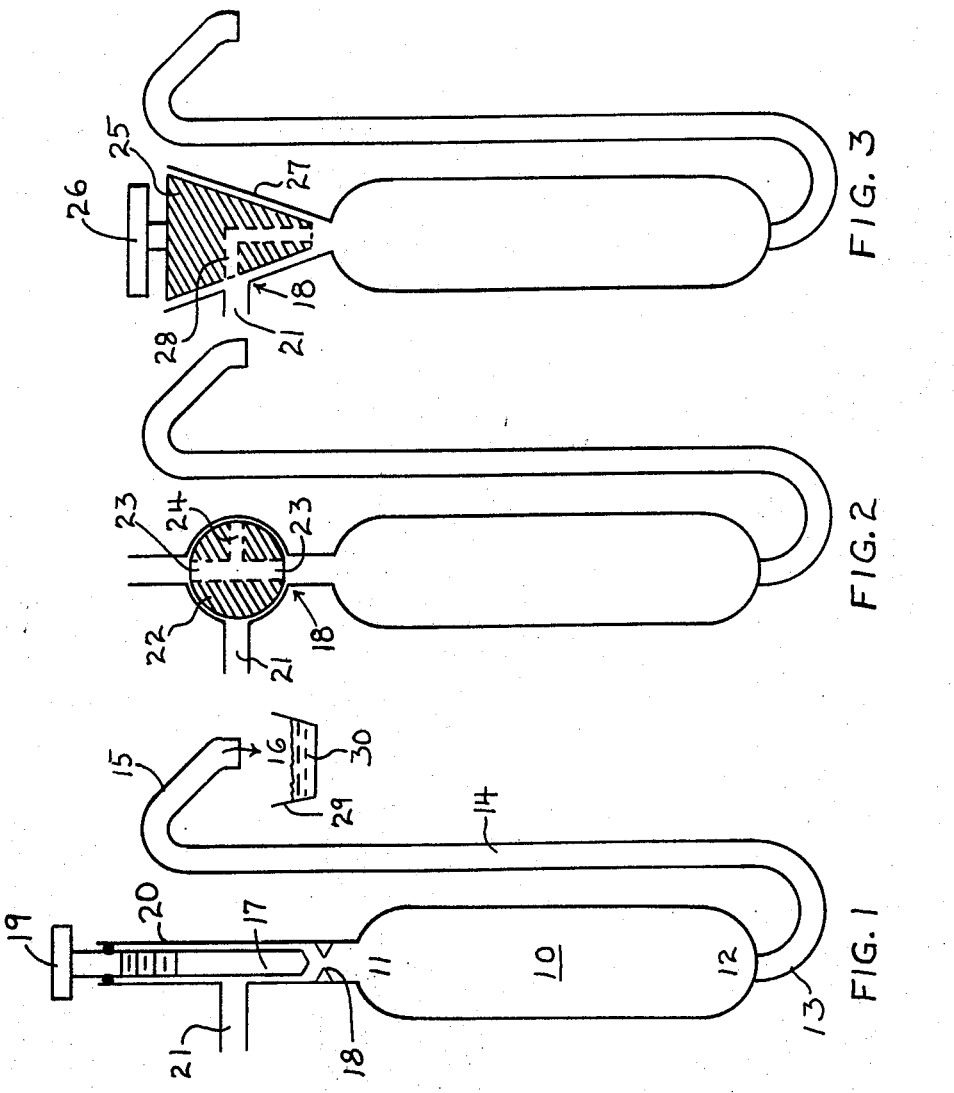
INVENTORS
EDWIN F. MEYER
ROBERT E. WAGNER, Jr.
BY *Harry M. Saragovitz,*
*Edward J. Kelly, Herbert Berl*
*& Robert P. Gibson*
ATTORNEYS

United States Patent Office 3,478,575
Patented Nov. 18, 1969

3,478,575
LIQUID DILATOMETER
Edwin F. Meyer, Washington, D.C., and Robert E. Wagner, Jr., Havre de Grace, Md., assignors to the United States of America as represented by the Secretary of the Army
Filed Sept. 1, 1967, Ser. No. 665,690
Int. Cl. G01n 9/00
U.S. Cl. 73—32                    2 Claims

ABSTRACT OF THE DISCLOSURE

A method and apparatus for measuring the volume and/or density of a liquid sample at various temperatures in which a bulbous member is provided with a valve controlled opening at its top for connecting the bulb with a source of liquid to be measured, or to a vacuum line, or which can be sealed by the valve. The bottom of the bulbous member opens into a U-tube which extends above the top of the bulb and terminates in a downwardly extending capillary arm with an outlet adapted to communicate with a receptacle containing a weighed quantity of measuring fluid which can be drawn into the bottom of the bulb through the U-tube, and partially displaced by the liquid sample occupying the space in the bulb between the valved opening and the measuring fluid, when the sample liquid is expanded by heat applied to the bulb. The amount of the measuring liquid drawn into the bulb and displaced therefrom is determined by weighing the fluid remaining in the receptacle before and after the bulb is heated, thereby providing a basis for determining the volume of the liquid sample and changes in such volume produced by changes in its temperature.

The invention described herein may be manufactured, used and licensed by or for the Government for governmental purposes without the payment to us of any royalty thereon.

BACKGROUND

The present method of making the desired measurements utilizes dilatometers of two piece construction as the most accurate ones now available. These dilatometers consist of a body and a glass cap, the contact surfaces of which are polished smooth. The sample is placed in the dilatometer so that a positive meniscus forms at the polished top of the instrument, i.e., a slight excess of the sample is used. The cap is then very carefully moved across the top of the dilatometer like a shutter to brush away the excess sample. Caution must be exercised that no air leaks into the dilatometer and for very accurate observation, the dilatometer should be filled in a controlled atmosphere and the sample transferred rapidly from its container to the dilatometer to avoid absorption of air which could affect the thermal expansion measurements.

The objections to this procedure are: (1) some of the sample is wasted; (2) an unknown amount of the sample is trapped between the polished glass surfaces, so that absolute density measurements are impossible and thermal expansion measurements by this technique are accompanied by a separate measurement of the absolute density using another instrument; (3) after transferring the sample to the dilatometer, it is no longer completely outgassed; (4) thermal expansion of mixtures whose components have appreciably different vapor pressures cannot be so handled, since more of one than the other is lost in transfer to the dilatometer.

SUMMARY OF THE INVENTION

The object of this invention is to provide a dilatometer which will have a precision of 1.5 parts in the fourth decimal, when the density is measured in grams per milliliters and retain this accuracy when determinations are made over a wide range of temperatures. For this, it is essential that the dilatometer be constructed to permit the liquid sample to be transferred into it without loss of liquid, and that the single container of the dilatometer allows the removal of gases (outgassing) of the liquid sample so that accurate determinations may be made and the erroneous values of density, due to the dissolved gases in the liquid sample, may be eliminated.

To obtain this objective, it is recognized that the dilatometer meet the following essential requirements: (1) be one in which the liquid sample is initially contained within the dilatometer but permits a space to exist between the closure seat and the liquid boundary to provide for outgassing the sample without loss of liquid; (2) be one in which a vacuum can be produced in the space between the initial liquid boundary and the valve seat; (3) be one which due to the vacuum existing simultaneously with outgassing, permits one liquid boundary to be moved so that it coincides with the seat of the valve; (4) be one in which the entire liquid sample is finally contained within the calibrated volume, one boundary of the liquid sample, whose density is being determined, being the seat of the closure; (5) be one which permits the introduction of liquid sample without any liquid being trapped above the closure seat; (6) be one having a capability which enables changes of volume with change in temperature to be accurately determined.

In the drawing:
FIGURE 1 is a diagrammatical view of the dilatometer.
FIGURE 2 is a view of a modified dilatometer showing a three-way valve in section.
FIGURE 3 shows a further modification of a valve fitting into a funnel shaped seat, and with an L-shaped bore for connection to vacuum apparatus.

Referring particularly to FIG. 1, which shows the bulbous member 10 having a top opening 11 and a bottom opening 12, the latter being connected to the U-tube 13. The U-tube has a leg 14 extending parallel to the vertical axis of the bulbous member 10 and considerably above said member, before being bent downwardly to form a capillary arm 15 with an outlet 16 at the open end thereof. The curvature of the arm 15 is downwards preferably to the axis of the bulbous member, but is operative if the angle is less than 90° with reference to that axis. The opening 11 of the bulbous member is connected to a closure provided with a Teflon needle valve 17 which is adapted to fit the valve seat 18, and is removable by means of the handle 19 from the housing 20. Above the valve seat 18 is an arm 21 in the housing 20 which may be connected to vacuum equipment (not shown) for the purpose of degassing the liquid in the bulbous member 10 and for the purpose of avoiding errors in the measurements due to contained gas in the liquid sample and the measuring fluid that may be in the bottom of the bulbous member. The receptacle 29 containing the measuring fluid 30, is adapted to be positioned so that the measuring fluid 30 may be drawn in through the capillary opening 16, and the receptacle plus the balance of fluid is weighed, so that in measuring the volume of a liquid sample under the prescribed conditions, the overflow of measuring fluid due to the displaced volume of sample is calculated by again weighing the receptacle 29 and contained fluid 30, the difference being the weight of the measuring fluid expelled and knowing the density of the measuring fluid the volume and/or the density of the liquid sample may be determined.

FIGURE 2 shows a modification in which a three way valve 22 is employing having a channel 23 aligned with the axis of the bulbous member 10, so that as in FIGURE 1, a liquid sample may be fed through a funnel in the axial channel 23; the rotary valve 22 has a bore 24 connecting with the channel 23, so that the clockwise rotation of the valve 90° will bring the bore 24 in line with the top opening of the bulbous member 10 and the bottom of the channel 23 will be aligned with the arm 21 for connection to the evacuating equipment and the top of channel 23 will be sealed of.

FIGURE 3 shows another modification with a valve 25 being a wedge-shaped stopper with a handle 26, fitting in a funnel-shaped seat 27 and having an L-shaped bore 28 for connection to arm 21 and the evacuating equipment. The stopper is removed when the liquid sample is introduced through a funnel.

The method for using this dilatometer is as follows: by light suction, draw into the dilatometer 2 to 5 milliliters of mercury 30 from a weighed container 29 through the capillary opening 16; remove the valve stem or align the plug of the stopcock and insert a funnel with the stem drawn into a capillary tube, small enough to pass through the valve seat and into the body of the dilatometer and introduced through the funnel approximately 10 milliliters of the liquid sample; remove the funnel; replace the valve stem or rotate the plug and reweigh the dilatometer to determine the weight of the sample; dip the capillary side arm 15 into the weighed container 29 of mercury, and by light suction, fill the sidearm completely with mercury; using a Dry Ice or liquid nitrogen bath, as required by sample, dip the dilatometer into the bath so that the mercury at the bottom of the bulbous member 10 freezes and seals the entrance to the U-tube, taking precaution that the capillary side arm 15 remains completely filled with mercury; continue the freezing of the dilatometer by raising the bath until the entire sample and mercury is frozen; attach the dilatometer to a vacuum pump (not shown) through the arm 21 and evacuated to at least .01 mm. mercury pressure; with the capillary side arm dipping into the weighed container 29 of mercury, allow the dilatometer to warm by raising it above the bath or conversely lowering the bath, with the result as the sample melts, any dissolved gases will be liberated and removed, and as the mercury melts, the vacuum will draw in mercury from the bath 30 until the dilatometer is filled. There is no loss of sample on outgassing as any vapors will be condensed on refreezing or will return to the liquid; the sample and mercury can be frozen again, the above treatment being repeated for the purpose of bringing the liquid level of the sample to the top boundary of the valve after melting and drawing in more mercury, as the vacuum is always between the liquid and the valve seat 18; if the capillary side arm is completely filled with mercury, since the volume of the dilameter at each temperature is known by calibration with mercury or some other measuring fluid, and the weights of sample in the dilatometer and the mercury required to fill the dilatometer are known, the volume and/or density of the sample can be accurately obtained. The density at other temperature is determined by inserting the dilatometer into a bath, heating to the desired temperature and collecting and weighing the mercury displaced from the capillary side arm, from which the volume of the sample at the new temperature may be calculated.

The apparatus of this dilatometer provides for introducing the sample without trapping any sample above the valve seat and the use of a funnel with a capillary stem is essential to prevent any portion of the sample from being in the zone between the valve seat and the valve proper, since any liquid trapped within the valve would lead to error in the determination, as its volume and weight would be unknown and it would evaporate in part during the determination. Thus by use of the capillary stem funnel, the sample may be introduced into the bulbous member without trapping any portion thereof above the valve seat and the weight of the sample being accurate, permits the correct determination of the volume of the sample. The device of the invention provides a rapid and simple means of measuring thermal expansion of liquids with an accuracy to the fourth decimal place about .02%.

A dilatometer constructed in accordance with the principles heretofore set forth in detail, results in improvements which include: (1) none of the sample is wasted; (2) since the mass of the sample transferred to the dilatometer can be determined accurately, the need for an extra density measurement is eliminated which in turn reduces the time required as well as the amount of the sample necessary; (3) the sample can be outgassed in situ, i.e., gaseous impurities can be removed after the sample is in the dilatometer; and (4) mixtures of components with appreciably different vapor pressures (including solutions of solids, liquids and gases in liquids), can be used in this dilatometer since the exposure of the sample to the atmosphere is minimal since loss of one or more of the components by vaporization can generally be eliminated by using proper filling technique.

What is claimed is:

1. A dilatometer comprising a bulb member having an opening in its top through which a liquid sample may be inserted, a closure connected to the top opening and having an orifice aligned with the vertical axis of the bulb member through which sample liquid may be directly inserted into the bulb, an additional arm in the closure for connection to a vacuum line for removal of residual gas from the liquid sample, said closure having a valve seat between the bulb member and the additional arm, a U-tube connected to the bottom of the bulb member in communication with the interior of the bulb and having its main portion substantially parallel to the vertical axis of the bulb and extending above the closure, said tube having its top end bent downwardly to form a capillary with an open end, and a receptacle containing a known amount of measuring fluid disposed adjacent the open end of the capillary and in communication therewith, whereby measuring fluid may be drawn into the capillary tube and lower end of the bulb in measured amounts by connecting the interior of the bulb to the vacuum line, sample fluid may be inserted directly through the top opening to fill the space between the valve seat and the measuring fluid in the bottom of the bulb and when expanded by heating the sample liquid will displace some of the measuring fluid, and the amount of such displaced fluid may be measured to determine the change in volume of the sample liquid.

2. In a dilatometer of known weight having a bulb member of known capacity with a closure at its upper end and a U-tube connected to its lower portion and extending above the closure and terminating in a downwardly facing open-ended capillary in communication with a receptacle containing a known amount and weight of measuring fluid, the method of measuring the density of a liquid which comprises drawing into the bottom of the bulb member through the open-ended capillary of a measuring fluid from its receptacle, filling the bulb above the measuring fluid through the closure with a liquid sample, freezing the liquid sample and measuring fluid in the bulb to seal the bottom of the bulb, connecting the bulb closure to a vacuum line for outgassing the contents of the bulb while melting the liquid sample, raising the temperature of the bulb sufficiently to melt the seal of measuring fluid to permit measuring fluid to be drawn from the U-tube into the lower end of the bulb with no residual gas between liquids, sealing the bulb closure, increasing the temperature of the contents of the bulb to a selected temperature so that expansion of the liquid sample will displace some of the measuring fluid back through the U-tube to the receptacle, and weighing the amount of measuring fluid so displaced.

References Cited

Shepherd, Martin; A Weight Burette for Micromeasurement of Liquid Volumes; 22 Scientific Papers of the Bureau of Standards 287–292; July 21, 1927.

RICHARD C. QUEISSER, Primary Examiner

JOHN K. LUNSFORD, Assistant Examiner